July 24, 1962 G. SCHAEFFLER 3,046,064
NEEDLE BEARINGS
Filed Aug. 3, 1959 2 Sheets-Sheet 1
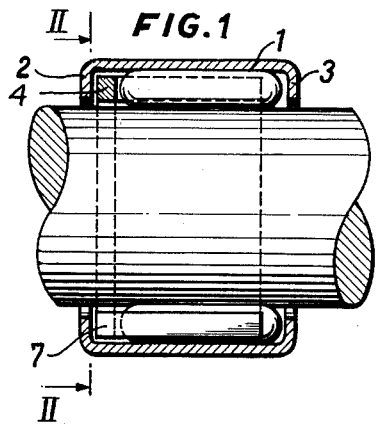
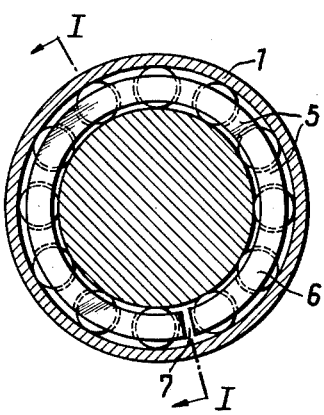
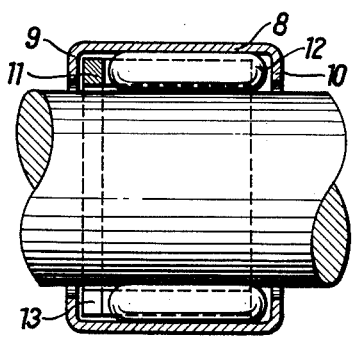

United States Patent Office 3,046,064
Patented July 24, 1962

3,046,064
NEEDLE BEARINGS
Georg Schaeffler, Herzogenaurach, Germany, assignor to Industriewerk Schaeffler oHG, Herzogenaurach, Germany, a German company
Filed Aug. 3, 1959, Ser. No. 831,419
Claims priority, application Germany Aug. 6, 1958
1 Claim. (Cl. 308—212)

This invention relates to an improvement in or modification of the needle bearing of patent application 738,195.

According to the present invention there is provided a needle bearing including a metal race consisting of a sleeve and radially directed hardened rims at opposite ends of said sleeve, a plurality of circumferentially spaced axial bearing needles, and a radially split cylindrical comb-like cage made of plastic material extending coaxially of said sleeve between said hardened rims, said comb-like cage having a single end ring and circumferentially spaced prongs extending axially to one side of said end ring, said prongs defining therebetween pockets in which said needles are rotatably disposed.

It has been found that it is more convenient for both rims of the race to be formed-on by drawing and for the race to be generally completed before assembly of the bearing. Further, the race can be hardened in its entirety instead of only partially as was hitherto necessary in the two needle bearings disclosed in patent application 738,195, now Patent No. 3,006,703, having formed-on rims at both ends of the race because the second rim was only formed-on after assembly of the bearing and could therefore not be hardened.

By having a comb-like cage split axially in at least one place the cage can be temporarily deformed and the positioning of the cage between the two rims of the race can be effected without difficulty. Having one radial gap in the cage also contributes to the inexpensive manufacture of the cage which is made from materials capable of being die-cast, preferably plastic material (i.e. natural or synthetic polymeric or resinous material), since it is possible to use ramless tools because the split cage can easily be released from its mould.

Figure 4:
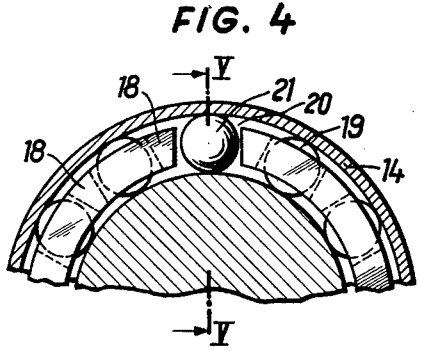
Figure 5:
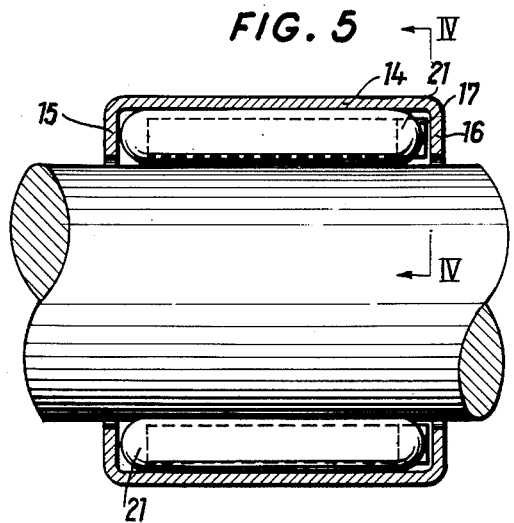

For a better understanding of the invention and to show how the same may be carried into effect, reference will now be made to the accompanying drawings, in which:

FIGURE 1 is a section through one embodiment of a needle bearing according to the invention, taken on line I—I of FIGURE 2, FIGURE 2 is a cross-section taken on line II—II of FIGURE 1, FIGURE 3 is an axial section through a second embodiment of a needle bearing according to the invention, FIGURE 4 is a partial cross-section of a third embodiment of a needle bearing according to the invention, taken on line IV—IV of FIGURE 5, and FIGURE 5 is a section through the needle bearing illustrated in FIGURE 4, taken on line V—V of FIGURE 4.

The bearing illustrated in FIGURES 1 and 2 comprises a hardened metal outer race shaped without cutting and constituted by a cylindrical sleeve 1 and by two radial formed-on or flanged-over rims 2 and 3 provided, before hardening of the race, at opposite axial ends of the sleeve 1.

A cylindrical comb-like cage made of natural or synthetic polymeric or resinous material is mounted in the race co-axially therewith and comprises an end ring 4 from which extend axially to one side thereof a plurality of equidistantly spaced prongs 5 formed along their opposite sides with concave surfaces which co-operate to define between the prongs generally cylindrical pockets in which cylindrical needles 6 having hemispherical terminal portions are disposed, the needles 6 having an axial length greater than the axial length of their pockets and a diameter greater than the radial thickness of the cage. The needles 6 thus can abut at one end against the ring 4 and at the opposite end against the hardened rim 3, and thus also prevent the cage from scraping the raceways defined by the shaft and the inside of the sleeve 1.

The cage is formed with a radial slit 7 which extends axially through the end ring 4 and through one of the prongs 5 so as to enable the cage to be sprung into position in the race between the two rims 2 and 3.

The bearing illustrated in FIGURE 3 is similar to the bearing shown in FIGURES 1 and 2 and comprises a hardened metal outer race shaped without cutting and constituted by a cylindrical sleeve 8 and by two radial formed-on or flanged-over rims 9 and 10 provided, before hardening of the race, at opposite ends of the sleeve 8.

A cylindrical comb-like cage 11 made of natural or synthetic polymeric or resinous material is mounted in the race co-axially therewith and comprises an end ring from which extend axially to one side thereof a plurality of equidistantly spaced prongs formed along their opposite sides with concave surfaces which co-operate to define between the prongs generally cylindrical pockets in which cylindrical needles 12 having hemispherical terminal portions are disposed, the needles 6 having an axial length greater than the axial length of their pockets and a diameter greater than the radial thickness of the cage 11.

The cage 11 is formed with a radial slit 13 which, in this embodiment, extends axially only through the end ring of the cage between two adjacent prongs.

The bearing illustrated in FIGURES 4 and 5 comprises a hardened metal outer race shaped without cutting and constituted by a cylindrical sleeve 14 and by two radial formed-on or flanged-over rims 15 and 16 provided, before hardening of the race, at opposite axial ends of the sleeve 14.

A cylindrical comb-like cage 17 made of natural or synthetic polymeric or resinous material is mounted in the race co-axially therewith and comprises an end ring from which extend axially to one side thereof a plurality of equidistantly spaced prongs formed along their opposite sides with flat surfaces which co-operate to define between the prongs pockets which have substantially parallel walls and in which cylindrical needles 19 having hemispherical terminal portions are disposed, the needles 19 having an axial length greater than the axial length of their pockets and a diameter greater than the radial thickness of the cage. The needles 19 can thus abut at one end against the hardened rim 15 and at the opposite end against the end ring of the cage.

The cage 17 is formed in the present embodiment with two diametrically opposite radial slits 20 extending axially through the end ring, the slits 20 each having the width of a cage pocket, so that the pockets with which the slits 20 communicate in effect together constitute elongated pockets separating the cage into two half-shells. These elongated pockets each accommodate a cylindrical needle 21 having hemispherical terminal portions which can abut against the two hardened rims 15 and 16. The needles 21 thus have a length greater than the length of the needles 19 and in effect separate the two half-shells of the cage.

I claim:

A needle bearing including a hardened metal race consisting of a sleeve and radially directed rims at opposite ends of said sleeve, a plurality of cylindrical bearing needles and a cylindrical comb-like cage made of resilient material extending co-axially of said sleeve between said rims, said cage having a single end ring, circumferentially spaced prongs extending axially to one side of said end ring, said prongs defining therebetween pockets in which said needles are rotatably disposed, and a radial slit extending axially through said end ring between two adjacent prongs, said slit and the pocket between said two adjacent prongs having the same width, and the needle disposed in the pocket between said two adjacent prongs extending into said slit.

References Cited in the file of this patent

UNITED STATES PATENTS

| | | |
|---|---|---|
| 71,973 | Burnap | Dec. 10, 1867 |
| 2,729,520 | Ritchie | Jan. 3, 1956 |
| 2,819,129 | Slick | Jan. 7, 1958 |

FOREIGN PATENTS

| | | |
|---|---|---|
| 425,141 | Italy | Sept. 13, 1947 |
| 938,452 | Germany | Feb. 2, 1956 |
| 959,699 | Germany | Mar. 7, 1957 |
| 772,218 | Great Britain | Apr. 10, 1957 |